Patented June 23, 1936

2,045,019

UNITED STATES PATENT OFFICE 2,045,019

DESSERT PREPARATION

Heinz G. Lorenzen, Chicago, Ill., assignor to Kitchen Art Foods, Inc., Chicago, Ill., a corporation of Delaware No Drawing. Application April 3, 1933,
Serial No. 664,205

4 Claims. (Cl. 99—139)

This invention relates to dessert preparations, and among other objects aims to facilitate the formation of such a preparation in cake form.

The invention may be readily understood by reference to one illustrative product and its process of manufacture described in the accompanying specification.

A dessert preparation of the character which forms the subject of this invention comprises an attractively colored product containing starch, sugar, flavoring and coloring material, which in order to utilize its attractive appearance for sales appeal, may advantageously be prepared in cake form. In adequately coherent cake form the product may be covered merely in a transparent wrapper and thereby displayed to the greatest advantage. In such form it possesses a substantial "eye value" which considerably facilitates merchandising. Moreover the packaging cost is much less than where a carton or the like is employed.

A dessert or similar food may be prepared from the aforesaid starch dessert cake by disintegrating the same in liquid such as milk and cooking it until it thickens the milk. When cooled it will form a highly palatable and attractive food, the consistency of which may be made to vary from that of a sauce to that of a pudding by varying the proportions of liquid employed. For a dessert of pudding consistency a cake of about three ounces may be cooked with a pint of milk to produce sufficient dessert for about seven portions.

The manufacture of the product in cake form involves the use of water which presents a substantial problem as regards stability of the product. I have discovered that by reason of the superior affinity of starch (as compared with sugar) for water, starch having a water content below certain limits may be employed to render any free or surplus water harmless either as a source of deterioration or as regards giving the cake objectionable physical characteristics. It is therefore practicable to add enough water to the dry ingredients (i. e. starch, sugar, etc.) to render the compound coherent throughout and suitable for pressing into cakes. The water also partially dissolves the sugar to render it capable, after formation of the product into a cake, of hardening and binding the material together with sufficient cohesion to withstand the handling to which a product of this character is subjected. The starch however prevents dissolution of the sugar to such an extent as to result in too hard a cake which would be difficult to disintegrate in cooking or to break up into fragments by hand prior to cooking. In other words, the affinity of the starch for water is such that it not only absorbs all surplus water (the water employed being substantially in excess of that employed by the sugar for limited recrystallization), but prevents an excessive dissolution of the sugar with the aforesaid objectionable results. On the other hand the balance between the sugar and starch is such that the latter does not prevent a partial and limited dissolution of the sugar nor utilization by the sugar of sufficient water to recrystallize adequately for present purposes, that part of the sugar which was dissolved. By prompt absorption of surplus water the starch prevents any progressive hardening of the sugar such as might take place over a period of time in the presence of even a small amount of free or available moisture. This applies also to any other liquid binding agents which might be employed to supplement the binding action of the sugar. In such cases also, the starch withdraws the surplus water while not preventing the formation of an adequate bond between the particles.

Another physical function served by the starch (which for this purpose is preferably somewhat coarse) is that of facilitating disintegration of the product on cooking and the breaking up of the cake into small fragments prior to cooking, by its presence throughout the mass between the minute interlocking sugar crystals. It thus both weakens the cake so that it may fairly easily be broken by hand and provides means through its liquid conducting power for substantially immediate penetration of the cooking liquid (milk for example) to the center and throughout each fragment of material. Thus penetration is so rapid that it takes place before the surfaces of the fragments could be rendered less pervious by gelatinization or otherwise through the action of the cooking liquid—assuming such action were possible in some cases. Substantially complete disintegration of both the cake and coarse particles before thickening temperatures (i. e. about 160° F.) are reached, is important. After the mixture has substantially thickened on cooking, the disintegrating action of the liquid ceases, and any lumps of material will likely remain in the finished dessert. It is desirable also to be able to remove the preparation from the fire as soon as boiling temperatures are reached (i. e. when the liquid begins to bubble), since this avoids excessive evaporation of liquid and/or of flavoring which would disturb the consistency and/or flavor of the finished dessert. If continued boiling be required to secure disintegration or otherwise, loss by evaporation will produce an inferior dessert.

To prepare the product, the sugar (for example corn, cane or beet sugar, or mixtures thereof) and a small amount of salt are placed in a mixer to which is added water and the liquid flavoring ingredients, all of which are thoroughly mixed together. The starch when added should preferably have a relatively low water content, i. e., in the neighborhood of 3 or 4%. Ordinary edible starch contains about 10% of moisture and if this be used it preferably should be treated to reduce its water content. However anhydrous starch which is commercially available may be employed instead. The starch may be in powdered but preferably is in granular condition, and if not previously colored should be added with the colors to the mixed water, sugar, etc. and thoroughly mixed therewith. Thereupon an appropriate quantity of the mixture is pressed into cakes and allowed to dry in the air, season and harden.

If the cakes are likely to be subjected to excessive handling such as to cause dusting of the surface inside the wrapper (this would affect only the appearance of the cake), an additional binding substance such as a dilute starch solution or sugar syrup may be employed in the product. This may either be mixed with the ingredients prior to formation into cakes or sprayed or otherwise coated over the surfaces of the cakes after they have dried.

As explained above, the starch serves, among other functions, to limit the extent of consolidation of the sugar into a mass and to remove surplus water as a source of deterioration. The proportions of starch, sugar and water are such that the final water content of the starch should preferably not exceed 10%. This affords an ample margin of safety against deterioration. While the starch probably could finally safely contain in the dried cakes as high as 14% of water, the latter is the maximum limit since with about 16% of water the starch would probably mold or ferment if exposed. Even when carefully wrapped, it would not be safe to assume that the starch would not mold with such a high percentage of moisture. Although it might be possible to employ the ordinary edible starch having a water content of 10% without exceeding 14% of moisture in the final product, this would be too close an approach to the limit of water content for commercial purposes. It is therefore desirable either to dry the starch or to employ anhydrous starch so as to provide an ample margin of safety.

Cakes are preferably formed in a die which controls their shape and with which adequate pressure may be exerted. The cakes may advantageously be approximately one inch square in cross section and two inches long. Two such cakes when wrapped together to form a unitary package weigh slightly in excess of three ounces and will produce from five to seven portions of dessert. The sub-division of each package into a plurality of cakes makes it much simpler for the housewife accurately to sub-divide the material in the event less than an entire package is to be employed. Each cake may be transversely "scored" in the mold, to facilitate its breakage into two equal cubes. The foregoing is important in view of the fact that accuracy of proportions of the product and cooking liquid are essential to secure desired consistency in the dessert.

The amount of water employed in the foregoing process varies somewhat depending upon the particular flavor employed. For example, if a dry flavoring material such as cocoa or chocolate be employed the bulk of dry ingredients is proportionally increased, requiring a larger amount of water. Also depending upon the character of the flavor, the sweetness desired and the kind of sugar employed, the amount of sugar will vary somewhat. For example, in a raspberry flavored product the proportions of ingredients are approximately as follows (the proportion of sugar being somewhat variable depending upon the sweetness desired):

| | | |
|---|---|---|
| Sugar (cane) | lbs | 13 |
| Starch | lbs | 7.2 |
| Raspberry flavor | oz | 4 |
| Salt | oz | 4 |
| Water | oz | 12 |

The proportions employed in a chocolate flavor will illustrate generally the proportions where dry flavoring ingredients are used:

| | | |
|---|---|---|
| Sugar (cane) | lbs | 12 |
| Starch | lbs | 8.2 |
| Salt | oz | 1½ |
| Vanilla | oz | 1 |
| Vanillin | oz | .025 |
| Cocoa (Yuma) | lbs | 3.5 |
| Water | oz | 18 |

When raw starch is employed there is usually a raw-starch taste to the dessert unless it be cooked for a substantially longer period (about twenty-five minutes) than is necessary merely to disintegrate the cake and thicken the cooking liquid. Substantial advantages in this and other respects will ensue if the starch be treated prior to the formation of the cakes. One illustrative treatment comprises mixing the raw powdered starch with a substantial quantity of water and pre-cooking the same until dry. At the same time the coloring matter may be added insuring a much better incorporation of the colors in the starch granules than would be possible otherwise. The amount of water employed is sufficient to cause a thorough distribution of the color through the mass but is preferably not enough to make the mixture flow. Actually it is in a moist lumpy condition with not quite water enough to flow. The starch may of course be of any appropriate edible form such as corn, tapioca, sago, potato, arrowroot, rice, etc. Its water content is not important at this stage.

The liquid ingredients, i. e., water and coloring solution together with a small amount of salt are placed together in a mixer to which powdered starch is added and thoroughly mixed with the other ingredients. The mixture is then heated or cooked for a number of hours with a gradual increase in temperature from room temperature to a temperature just below its gelatinizing point, namely, about 160° F. This temperature is not allowed to exceed this level. While the starch is not gelatinized it is of course partially hydrolyzed and in such condition as to require very little additional cooking in the preparation of the dessert. The cooking process reduces the water content to less than 4% on the starch.

The starch may advantageously be cooked by placing it on trays which are introduced into an oven where the temperatures may be raised and maintained as aforesaid. About eight hours is required for thus properly pre-cooking and drying the starch.

Upon the completion of the cooking process the starch is lumpy and is ground to a suitably fine condition. Preferably the grinding is not carried too far since a number of advantages ensue from employing a somewhat granular or coarse starch. Generally the maximum size of the particles is about ten mesh, though limitation to this size is apparently not essential. Of course a small percentage of the starch is inevitably ground much finer in the process.

The aforesaid cooking process not only removes the raw starch taste which is disagreeable to some but also renders the starch much more easily "soluble" in the cooking milk or water. The proportions of water and starch employed in the pre-cooking process will be sufficiently illustrated from the following example:

| | | |
|---|---|---|
| Powdered starch | lbs | 200 |
| Water | lbs | 120 |
| Salt | oz | 6 |
| Color solution | oz | 48 |

The color solution of course varies in amount depending upon the particular color since various colors differ in intensity. The color solution may be prepared by adding a small quantity of certified color to a substantial volume of water, i. e., in the neighborhood of four parts of certified color to 128 parts of water.

Cakes formed with the use of pre-cooked starch not only require less cooking by the housewife but disintegrate much more readily by reason of the larger size and increased porosity of the starch granules. This porosity increases the facility with which the cooking liquid will penetrate the mass to disintegrate it and place it in solution. A cooking time of only about two minutes is necessary in this case. Also the granular condition of the pre-cooked starch facilitates mixing and handling in the dies since it is not as sticky as powdered raw starch.

Obviously the invention is not limited to the details of the illustrative product and process of manufacture since these may be variously modified. Moreover it is not indispensable that all features of the invention be used conjointly since various features may be used to advantage in different combinations and sub-combinations.

Having described my invention, I claim:

1. A starch dessert cake which is readily disintegrable in its cooking liquid before modification of the starch comprising in combination starch and sugar each in granular form together with flavoring material all of which are bound together into a cake by partially recrystallized sugar, the starch granules being distributed throughout the cake by interspersed sugar crystals and having a water content below 14% whereby to prevent progressive recrystallization of the sugar into a hard impervious mass, the proportion and size of starch granules in said cake being such as to maintain the cake friable and to cause the cake to readily disintegrate in the cooking liquid before any substantial gelatinization of the starch.

2. The method of making a friable starch dessert product comprising taking coarse granular cooked starch having a water content of approximately 4% and in which the granules are substantially larger than the grains of commercial powdered starch, mixing the starch granules with sugar and sufficient water without raising the water content of the starch above 14%, whereby the starch granules are so distributed and bound together by the partially recrystallized sugar as to render the product friable and quickly permeable by cooking liquid.

3. The method of making a friable starch dessert product comprising mixing powdered starch with liquid coloring material, heating the mixture at a temperature below the boiling point of water until dry to reduce the water content of the starch to approximately 4% and leaving it in a highly absorbent state, then grinding the dehydrated starch to form granules of a maximum coarse size substantially larger than the grains of powdered starch, mixing the starch granules with granular sugar and sufficient water to partially dissolve the sugar without raising the water content of the starch above 14%, pressing the mass into cakes in which the starch granules are bound together by the partially recrystallized sugar forming a porous friable product.

4. A friable starch dessert cake which is readily disintegratable in a cooking liquid, comprising coarse cooked starch granules bound together by partially recrystallized sugar, the crystals of which are so interspersed between the starch granules as to bind same together into a porous cake, the water content of the starch being less than 14% thus serving to protect the interspersed sugar crystals from excess moisture and preserving the dessert cake in a friable state.

HEINZ G. LORENZEN.